United States Patent
Chen

(10) Patent No.: US 10,396,691 B1
(45) Date of Patent: Aug. 27, 2019

(54) MOTOR CONTROL CIRCUIT SYSTEM

(71) Applicant: Der-San Chen, New Taipei (TW)

(72) Inventor: Der-San Chen, Tainan (TW)

( * ) Notice: Subject to any disclaimer, the term of this patent is extended or adjusted under 35 U.S.C. 154(b) by 0 days.

(21) Appl. No.: 15/903,046

(22) Filed: Feb. 23, 2018

Related U.S. Application Data

(63) Continuation-in-part of application No. 14/852,617, filed on Sep. 13, 2015, now abandoned.

(51) Int. Cl.
    *H02P 6/14*     (2016.01)
    *H02P 6/182*    (2016.01)
    *H02P 6/17*     (2016.01)
    *H02P 1/02*     (2006.01)

(52) U.S. Cl.
    CPC ............ *H02P 6/182* (2013.01); *H02P 1/029* (2013.01); *H02P 6/17* (2016.02)

(58) Field of Classification Search
    CPC ..................... H02P 6/14; H02H 5/2573
    See application file for complete search history.

(56) References Cited

U.S. PATENT DOCUMENTS

2014/0346994 A1* 11/2014 Pogorzelski ............ H02M 1/08
                                                                318/437

* cited by examiner

*Primary Examiner* — Karen Masih

(57) ABSTRACT

A motor control circuit system is arranged to control the activation of a motor when the input voltage of the motor equals to a predetermined threshold so as to save the power consumption of the motor, wherein no current is allowed to pass to the motor before the input voltage of the motor reaches again the predetermined threshold. Therefore, the motor is electrified in an intermittent manner, such that the driven mechanism runs with its inertia even though the motor is idling, i.e. no current passing to the motor, so as to save the energy consumption of the motor.

7 Claims, 6 Drawing Sheets

US 10,396,691 B1

MOTOR CONTROL CIRCUIT SYSTEM

The invention is a continuation in part (CIP) of the U.S. patent application Ser. No. 14/852,617 invented and assigned to the inventor of the present invention, and thus the contents of the U.S. patent application Ser. No. 14/852,617 are incorporated into the present invention as a part of the specification.

BACKGROUND OF THE PRESENT INVENTION

1. Field of Invention

The present invention relates to a motor circuit system, in particular, an energy saving controlling circuit system for motors.

2. Description of Related Arts

An existing driven mechanism is generally driven by a motor. When the driving voltage from the driven mechanism is greater than zero, the motor is actuated. Therefore, the driving voltage must be continuously supplied to the motor whether the driven mechanism runs or not. As a result, it is a waste of energy when the driven mechanism is in an idle condition. In this case, the driven mechanism can run on its own inertia without the power consumption of the motor through continuous supply of the driving voltage.

Accordingly a motor is designed to self-generate a rotational power for the rotor at an initial state when the actual voltage to the motor is insufficient or reduced. In particular, such design of an existing motor is controlled by a timer relay and its setting of time period (such as after a few second). For example, the aforementioned timer relay will switch on an MCD (Magnetic Contact DELTA) and switch off an MCM (Magnetic Contact MAIN) to short the feedback circuit, so as to power up the motor at a full rotationally loading speed. Even though such design mainly uses a timing method to energize the motor efficiently, it cannot completely respond to the voltage change for the rotational speed and cannot controllably stop the power consumption of the motor.

SUMMARY OF THE PRESENT INVENTION

An objective of the present invention is to provide a motor control circuit system for driving a driven mechanism, which comprises: a motor driven by an alternating current; a control electrically connected to the motor, wherein the control is activated to let the AC current pass to the motor and to stop the AC current from passing to the motor; a processor unit electrically linked to the control, wherein the processor unit comprises a voltage controlling module; a sensor electrically linked to the processor unit; and a converter electrically linked to the processor unit, wherein the voltage controlling module lets the current pass to the motor when a input voltage of the motor reaches a predetermined threshold, and the voltage controlling module stops the current from passing to the motor when the input voltage of the motor reaches again the predetermined threshold.

With the design and configuration of the present invention, the motor will generate an output only when the input voltage of the motor at the predetermined threshold. Therefore, no current will pass to the motor before the input voltage of the motor reaches again the predetermined threshold. In other words, the motor is electrified in an intermittent manner, such that the driven mechanism will run with its inertia even though the motor is idling (no current), so as to save the energy output of the motor. Since the sensor of the present invention does not depend on time detection as the conventional configuration, the sensor can provide an actual dynamic detection to improve its reliability comparing with conventional timer counting devices. These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

With the aids of the Figures shown below, the content of techniques, features, and embodiments of the present invention is herein described, so as for the examiners to further understand the present invention.

Figure 1:
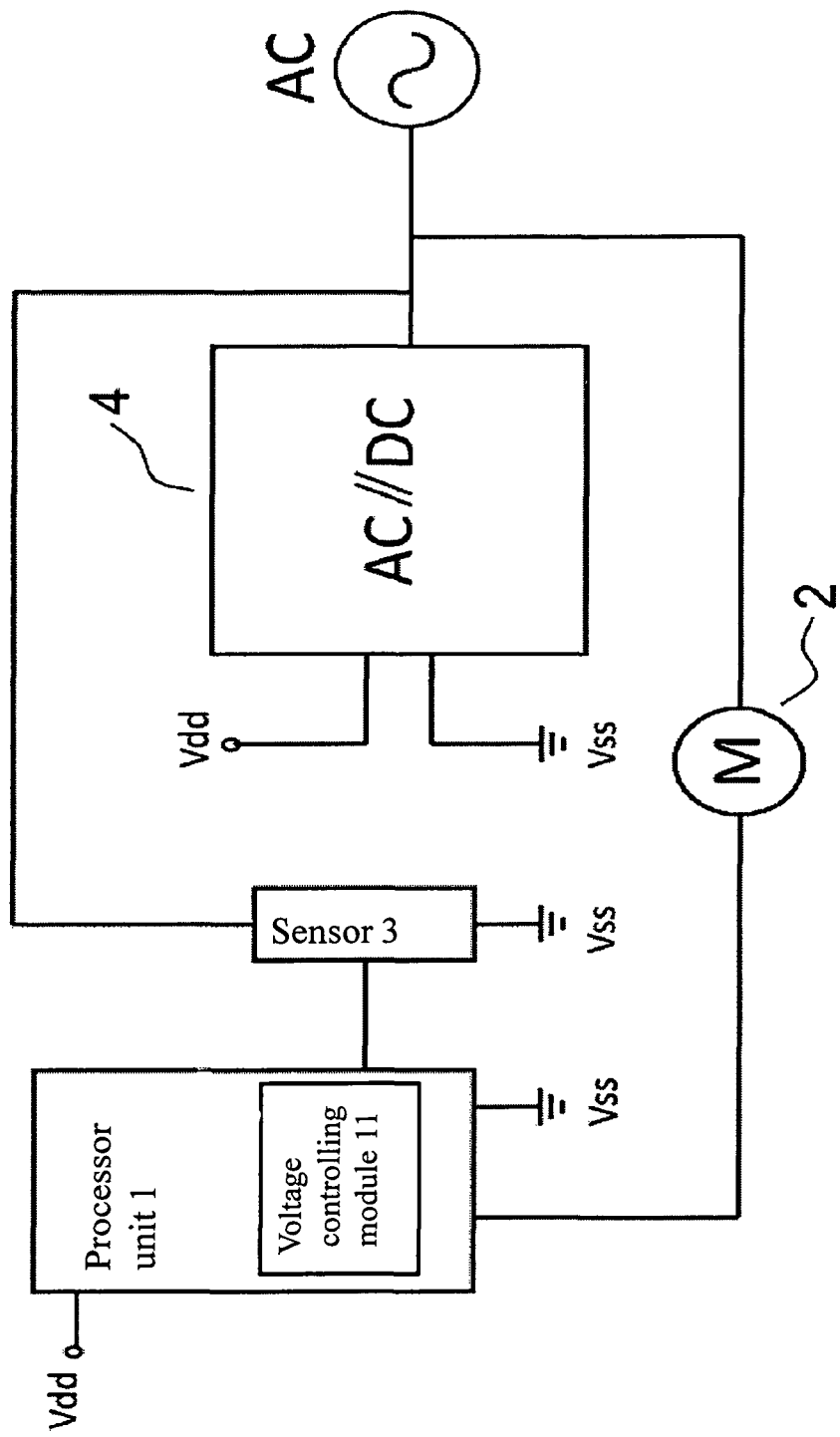
FIG. 1 is a diagram of a system according to a preferred embodiment of the present invention.
Figure 3:
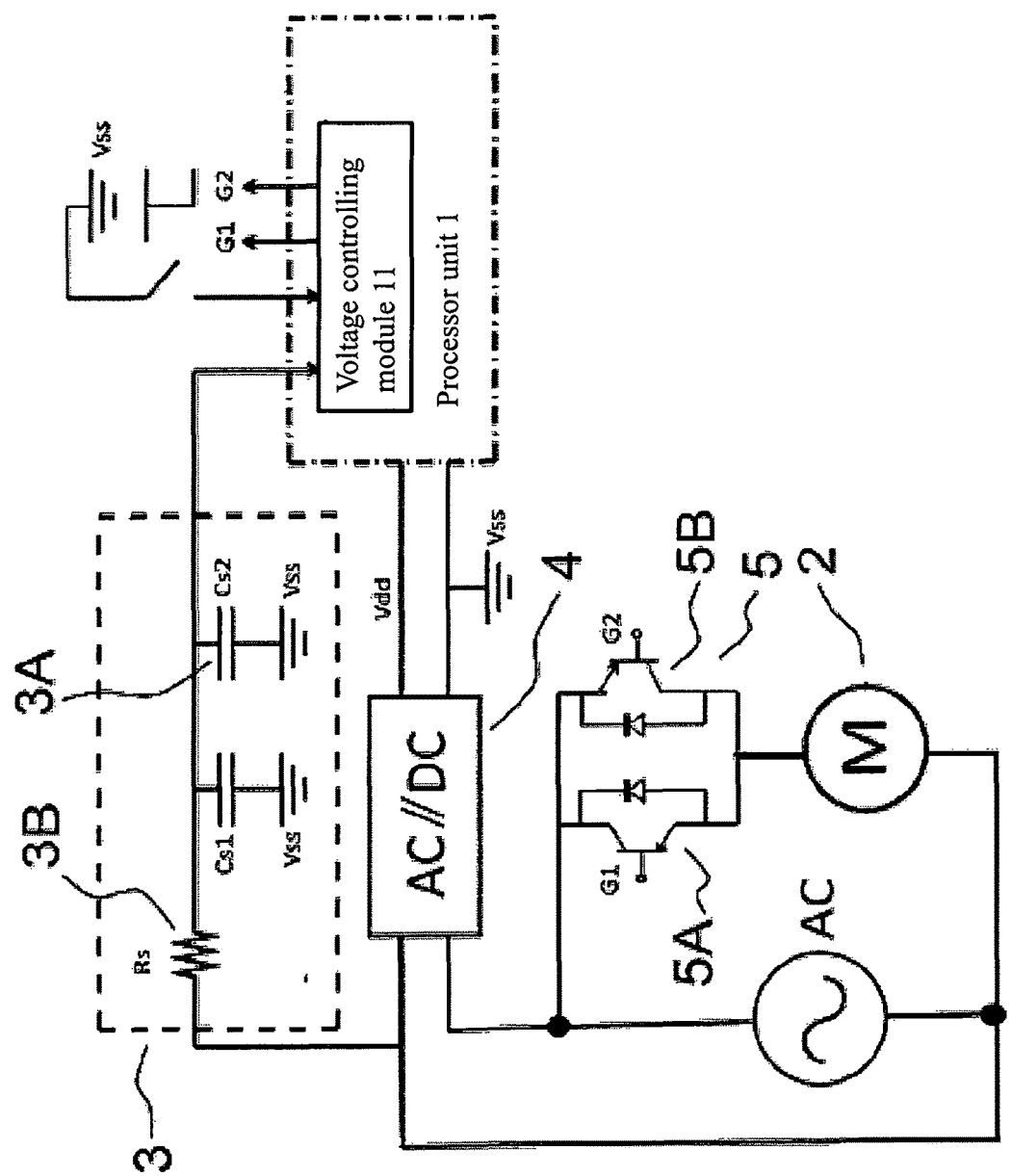
FIG. 3 is a circuit diagram illustrating the system according to the above preferred embodiment of the present invention.

Referring to FIGS. 1 and 3 of the drawings, a control circuit system of a motor 2 according to a preferred embodiment of the present invention is illustrated, wherein the motor 2 is configured for driving a driven mechanism, such as an electric fan, an electric power tool, a compressor, a washer, a spin-drier, a dryer, a food processor, a refrigerator, and other mechanisms that can be driven with the motor.

The present invention comprises a motor 2, a controller 5, a processor unit 1, a sensor 3, and a converter 4.

The motor 2 is driven by an alternating current.

The controller 5, which serves as a switch, is electrically connected to motor 2, wherein the controller 5 is activated to control the supply of AC current to The motor 2. In particular, the controller 5 is activated to let the AC current from the AC current source to the motor 2 and to stop the AC current to motor 2. The current is continuous sine waves. The controller 5 Controller 5 comprises a positive half sine wave controller switch 5B and a negative half sine wave controller switch 5A.

A safety control switch (not shown in drawings) is optionally connected to the controller 5 to electrically connect to processor unit 1 for initially activating the motor under a safety condition.

The processor unit 1 is electrically linked to the controller 5, wherein the processor unit 1 comprises a voltage controlling module 11. Preferably, the voltage controlling module 11 can be a software or a program to be installed. The voltage controlling module 11 controls the positive half sine wave controller switch 5B and the negative half sine wave controller switch 5A of the controller so that current passes to motor 2 when the input voltage of the motor 2 reaches predetermined starting thresholds and stops passing to the motor 2 when the input voltage of the motor 2 reaches predetermined ending thresholds.

The sensor 3 is electrically linked to the controller 5, wherein sensor 3 comprises a resistance 3B and two sensing capacitors 3A electrically connected with each other. The sensor 3 serves to detect voltage changes in the AC current source and transfers the voltage changes to state changes of voltage controlling module 11.

The converter 4 is electrically linked to the controller 5 and the processor unit 1. The converter 4 serves to the convert AC current in an input end thereof to DC current in an output end thereof so as to supply power to the processor unit 1.

Accordingly, the voltage controlling module 11 is activated, such as executing the program, to electrify the motor 2 when the input voltage of the motor 2 reaches a predetermined threshold. Therefore, for a power supply generating periodic voltage waves, a starting threshold and an ending threshold are set to each half of the voltage waves; the starting threshold is set at one point of the half wave, and the ending threshold is set at the same half wave after the starting threshold; when the input voltage of motor 2 reaches the starting thresholds, the voltage controlling module 11 turns on the positive half sine wave controller switch 5B or the negative half sine wave controller switch 5A respectively, so as to cause current to start to pass through motor 2; and when the input voltage of motor 2 reaches the ending thresholds, the voltage controlling module 11 turns off the positive half sine wave controller switch 5B or the negative half sine wave controller switch 5A respectively, so as to cause current to stop passing through motor 2; therefore, during the rest part of the voltage waves, motor 2 will turn with its own rotational inertia so as to save power thereto. Then, before the input voltage of the motor 2 reaches again the predetermined threshold, the voltage controlling module 11 will stop the current passing to the motor 2. In other words, the voltage controlling module 11 will let the current passing to the motor 2 when the input voltage of the motor 2 equals to the predetermined threshold, and the voltage controlling module 11 will stop the current passing to the motor 2 when the input voltage of the motor 2 differs from the predetermined threshold.

Figure 2:
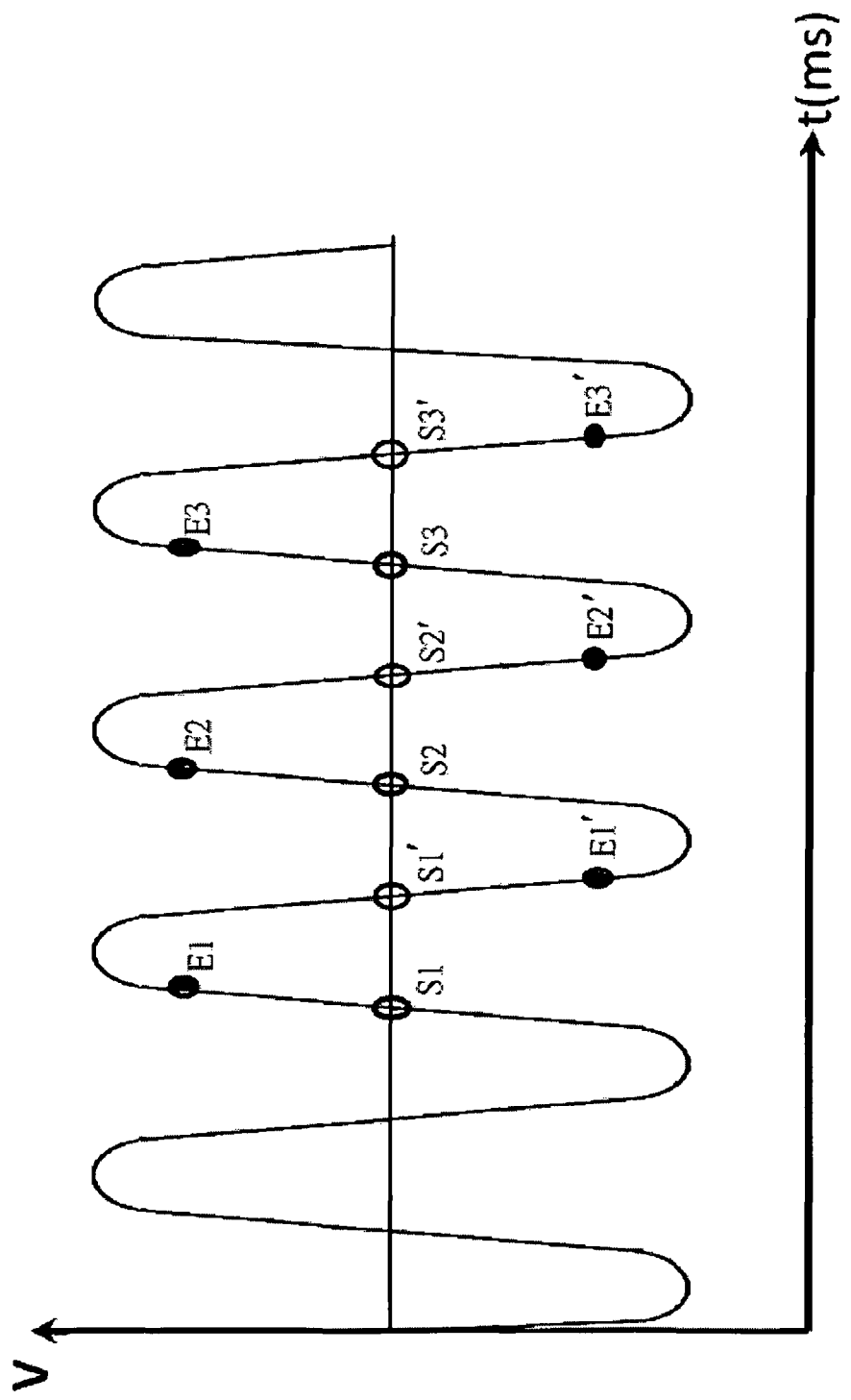
FIG. 2 is a diagram illustrating an output of the system according to the above preferred embodiment of the present invention.

As shown in FIG. 2, the input voltage of the motor 2 is configured to have a starting threshold START (S1) and an ending threshold END (E1) to save the power consumption of the motor 2. Preferably, the stating threshold is set at zero value. Before the input voltage of the motor 2 reaches START (S1') from START (S1), the current is stopped passing through the motor 2. In other words, the motor 2 is electrified in an intermittent manner, such that the driven mechanism will run with its inertia even though the motor 2 idles (no current), so as to save the energy consumption of the motor 2. In addition, the sensor 3 is electrically linked to processor unit 1. It detects the actual voltage variation of the motor and transmits the data to processor unit 1 immediately for comparison with the stating thresholds. The sensor 3 provides an actual dynamic detection instead of timer relay basis controlling mechanism as the conventional configuration and enhances the accuracy and reliability thereof.

Accordingly, the reference power supply of sensor 3 and the reference power supply of processing unit 1 remain at constant level, respectively. Therefore, an accurate value will be obtained by applying the same measuring basis.

According to the preferred embodiment, the starting threshold of motor 2 is set as zero value, and sensor 3 is arranged for detecting zero voltage of motor 2 regarding the sine wave thereof. The starting threshold of motor 2 set at zero value is to obtain the best energy saving efficiency.

Figure 4:
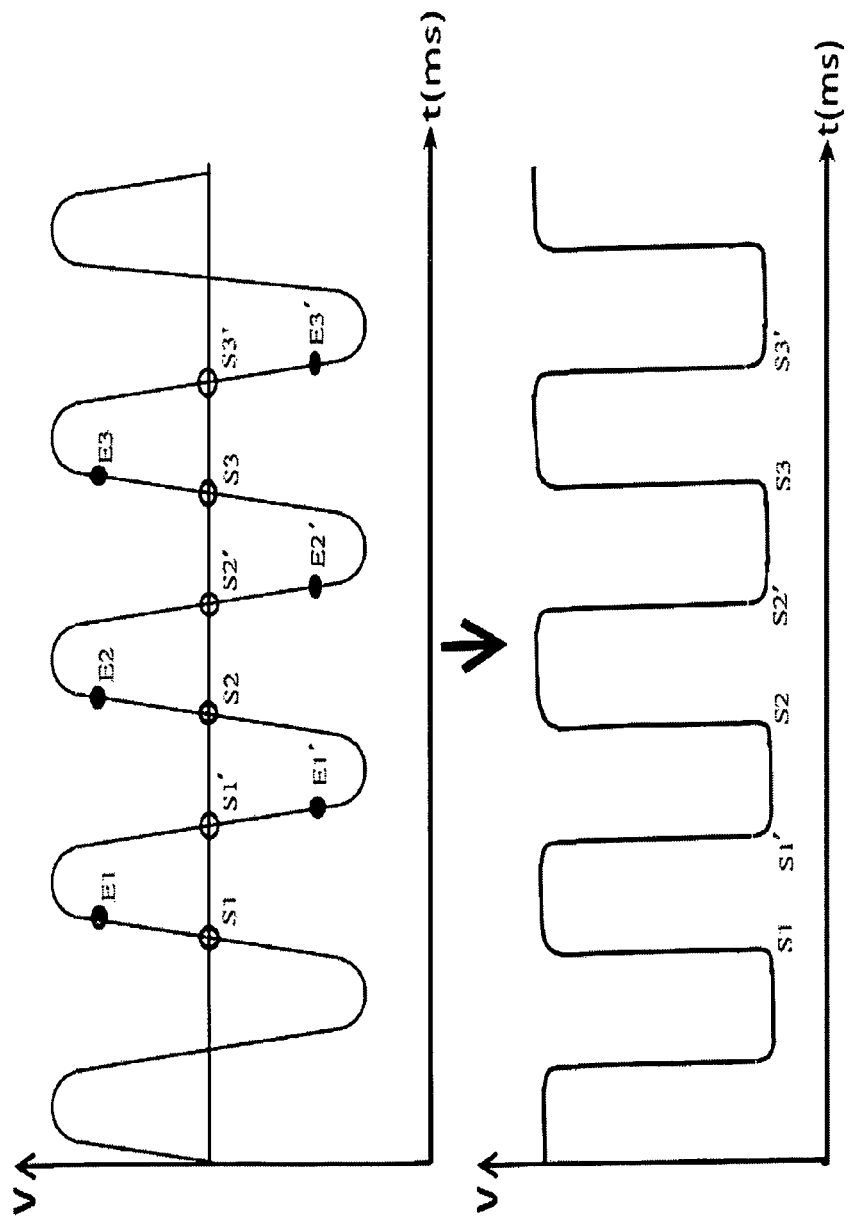
FIG. 4 is a diagram illustrating the wave transformation of the system according to the above preferred embodiment of the present invention.

As shown in FIG. 4, the sensor 3 of the present invention is arranged to convert the electrical wave of the motor 2 from the sine waveform into a square waveform, so as to further detect the input voltage of the motor 2 the sequentially in time. In particular, the sensor 3 will detect the starting threshold of the motor 2 at zero value and the higher voltage value (greater than the starting threshold) in a process of time.

Figure 5:
FIG. 5 is a first diagram illustrating the power consumption of the system according to the above preferred embodiment of the present invention.
Figure 5:
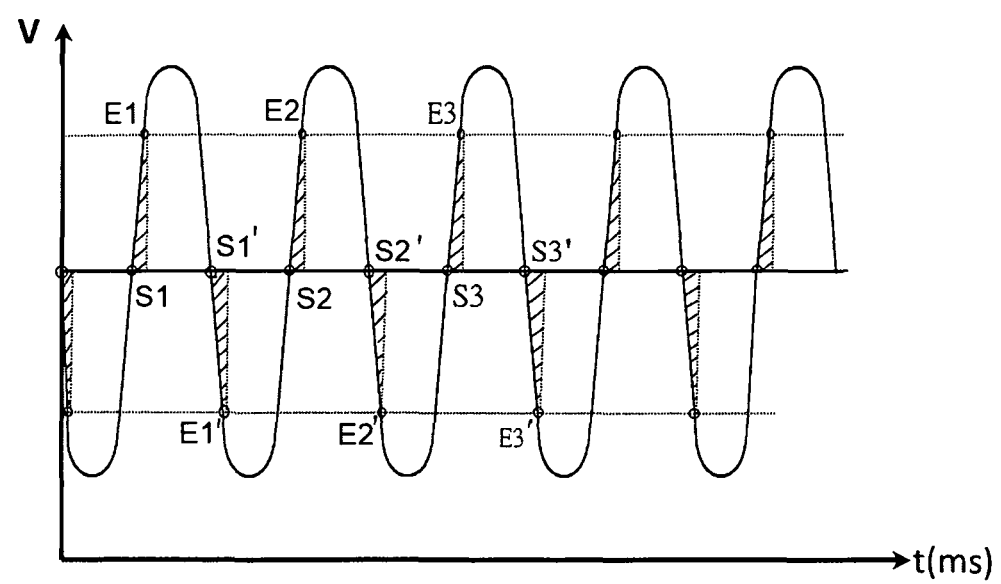
Figure 6:
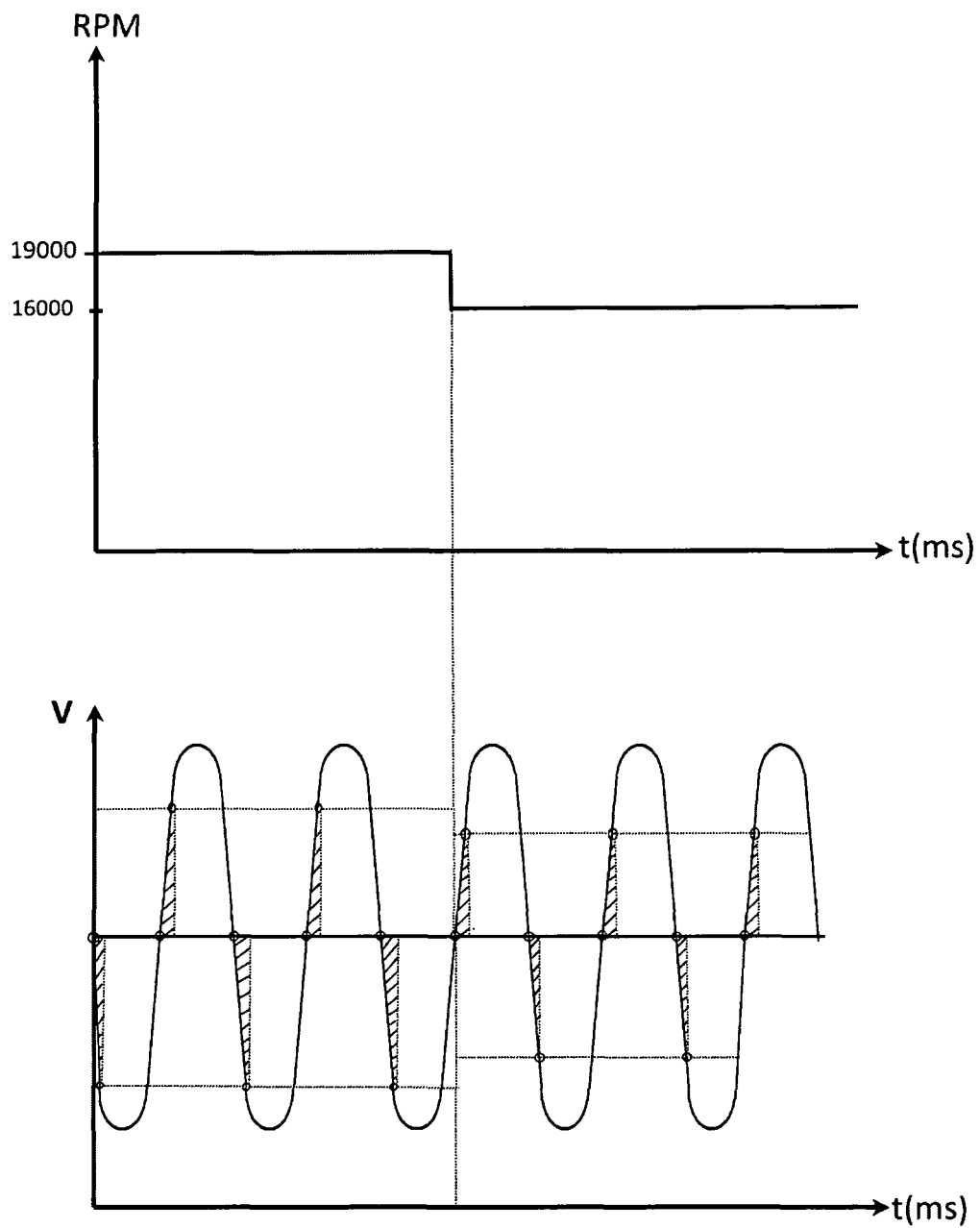
FIG. 6 is a second diagram illustrating the power consumption of the system according to the above preferred embodiment of the present invention.

FIG. 5 illustrates the electrical consumption of the motor 2. When the rotational speed of the driven mechanism is at 19,000 RPM, the electrical consumption of the present invention is represented by the shaded area in FIG. 5. In other words, the power demand for operating the motor 2 can be greatly reduced. As shown in FIG. 6, when the rotational speed of the driven mechanism is reduced to 16,000 RPM, the energy consumption of the present invention can be controlled and reduced accordingly. In other words, the motor 2 can be initially started at zero voltage, wherein the current can be stopped from passing to the motor 2 at any point of the sine wave. For example, the current can be stopped from passing to the motor 2 at a designated point at the positive half sine wave via the positive half sine wave controller switch or at the negative half sine wave via the negative half sine wave controller switch.

According to the preferred embodiment, voltage controlling module 11 is continuously activated (executed) to repeatedly let the current passing to the motor 2 and stop the current from passing to the motor 2. The voltage controlling module 11 can alter the point of time when the current starts passing to the motor 2 and the current stops passing to the motor 2. As a result, the rotational speed of the motor 2 can be correspondingly and continuously changed according to the voltage level of the motor 2, so as to produce turbulent flow in fluid. For example, the motor 2 at the food processor to chop the food evenly, the motor 2 at the electric fan to generate a natural airflow, or the motor 2 at the electric washer to generate an even spinning movement for preventing the clothes from being tangled. The motor 2 of the present invention can also be extensively applied to three-phase motors. With a more accurate calculation and more sensors, it can achieve better energy efficiency.

All in all, the present invention certainly fits industrial applicability and has not been published or used in public before the current application. It also has not been known by the public, but has non-obviousness nature, which meets the requirements of patentability, so it is lawfully submitted to apply for a patent accordingly.

However, the above descriptions are only a preferred embodiment of the present invention industrially. All equivalent varieties and modifications based on the appended claims of the present invention should therefore logically fall within the scope of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A motor control circuit system for a driven mechanism, which comprises:
   a motor driven by an alternating current;
   a controller serving as a switch and electrically connected to the motor, wherein the controller is activated to control a start and stop of supplying AC current to the motor; wherein the controller comprises a positive half sine wave controller switch and a negative half sine wave controller switch;
   a processor unit electrically linked to the controller, wherein the processor unit comprises a voltage controlling module;
   a sensor electrically linked to the controller;
   a converter electrically linked to the controller and the processor unit;
   wherein the voltage controlling module controls the positive half sine wave controller switch and the negative half sine wave controller switch of the controller so that current starts to pass to the motor when an input voltage of the motor reaches predetermined starting thresholds and stops passing to the motor when the input voltage of the motor reaches predetermined ending thresholds;
   wherein for a power supply generating periodic voltage waves, a starting threshold and an ending threshold are set to each half of the voltage waves; the starting threshold is set at one point of the half wave, and the ending threshold is set at the same half wave after the starting threshold; when the input voltage of the motor reaches the starting thresholds, the voltage controlling module turns on the positive half sine wave controller switch or the negative half sine wave controller switch respectively, so as to let current start passing through the motor, and when the input voltage of the motor reaches the ending thresholds, the voltage controlling module turns off the positive half sine wave controller switch or the negative half sine wave controller switch respectively, so as to stop current from passing through the motor; therefore, during the rest part of the voltage waves, the motor will turn with its own rotational inertia so as to save power thereto.

2. The motor control circuit system as claimed in claim 1, wherein the starting threshold and the ending threshold are set to zero value of a sine wave.

3. The motor control circuit system as claimed in claim 1, wherein the motor which it controls is a three-phase motor.

4. The motor control circuit system as claimed in claim 1, wherein the sensor converts input electrical wave of the motor from a sine waveform into a square waveform.

5. The motor control circuit system as claimed in claim 1, wherein the sensor comprises at least one sensing capacitor.

6. The motor control circuit system as claimed in claim 1, wherein a reference power supply of the sensor and a reference power supply of the processing unit remain at constant level, respectively.

7. The motor control circuit system as claimed in claim 1, further comprising a safety control switch electrically connected to the processor unit for initially activating the motor under a safety condition.

* * * * *